(12) United States Patent
Ohtsu

(10) Patent No.: US 6,374,362 B1
(45) Date of Patent: Apr. 16, 2002

(54) DEVICE AND METHOD FOR SHARED PROCESS CONTROL

(75) Inventor: Toshiyuki Ohtsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/229,338

(22) Filed: Jan. 13, 1999

(30) Foreign Application Priority Data

Jan. 14, 1998 (JP) .......................................... 10-017936

(51) Int. Cl.[7] ............................. H02H 3/05; G06F 12/00
(52) U.S. Cl. ............................ 714/4; 710/200; 710/240
(58) Field of Search ................................. 709/200, 201, 709/202, 203, 213; 710/131, 200, 240; 714/13, 29, 42, 708, 4

(56) References Cited

U.S. PATENT DOCUMENTS

| | | | | |
|---|---|---|---|---|
| 5,394,551 A | * | 2/1995 | Holt et al. | 710/200 |
| 5,845,082 A | * | 12/1998 | Murakami | 709/226 |
| 5,884,046 A | * | 3/1999 | Antonov | 709/202 |
| 5,896,503 A | * | 4/1999 | Badovinatz et al. | 709/201 |
| 6,041,376 A | * | 3/2000 | Gilbert et al. | 710/108 |
| 6,085,295 A | * | 7/2000 | Ekanadham et al. | 711/145 |

FOREIGN PATENT DOCUMENTS

| | | |
|---|---|---|
| JP | 6336545 | 7/1988 |
| JP | 355657 | 3/1991 |
| JP | 5225117 | 9/1993 |
| JP | 64319 | 1/1994 |
| JP | 6-19856 | 1/1994 |
| JP | 6-110845 | 4/1994 |
| JP | 6149765 | 5/1994 |
| JP | 6-161859 | 6/1994 |
| JP | 7-13939 | 1/1995 |
| JP | 8212064 | 8/1996 |
| JP | 8332675 | 12/1996 |
| JP | 9212561 | 8/1997 |

OTHER PUBLICATIONS

"ACOS Software, ACOS–4/XVP PX, JES–PX Explanation and User Manual", NEC Corporation, Sixth Edition, Sep. 1996.

* cited by examiner

Primary Examiner—Robert Beausoleil
Assistant Examiner—Tim Vo
(74) Attorney, Agent, or Firm—Young & Thompson

(57) ABSTRACT

A computer system is configured by multiple nodes and a shared memory, which contains a shared process control table and multiple shared processes. Herein, each of the nodes contains a shared process dispatcher and a node failure recovery unit, while the shared process control table stores process control blocks and node flags. If the shared process is occupied by other nodes, the shared process dispatcher controls issuance of a service request from the present node to wait. If not, it controls the node flag to represent an even that the shared process is occupied by the present node while controlling the shared process to process the service request. After completion in processing of the service request by the shared process, the shared process dispatcher of the present node clears the node flag to place the process control block in a state to wait for a next service request, while it also communicates with the shared process dispatches of the other nodes to inform them of an event that the shared process is released. At occurrence of a failure on a "failure" node within the multiple nodes, the node failure recovery unit of a certain "normal" node clears the node flag while placing the process control block in a state to wait for a service request. In addition, it communicates with the node failure recovery units of other nodes to inform them of an event that the shared process is capable of receiving a service request.

9 Claims, 5 Drawing Sheets

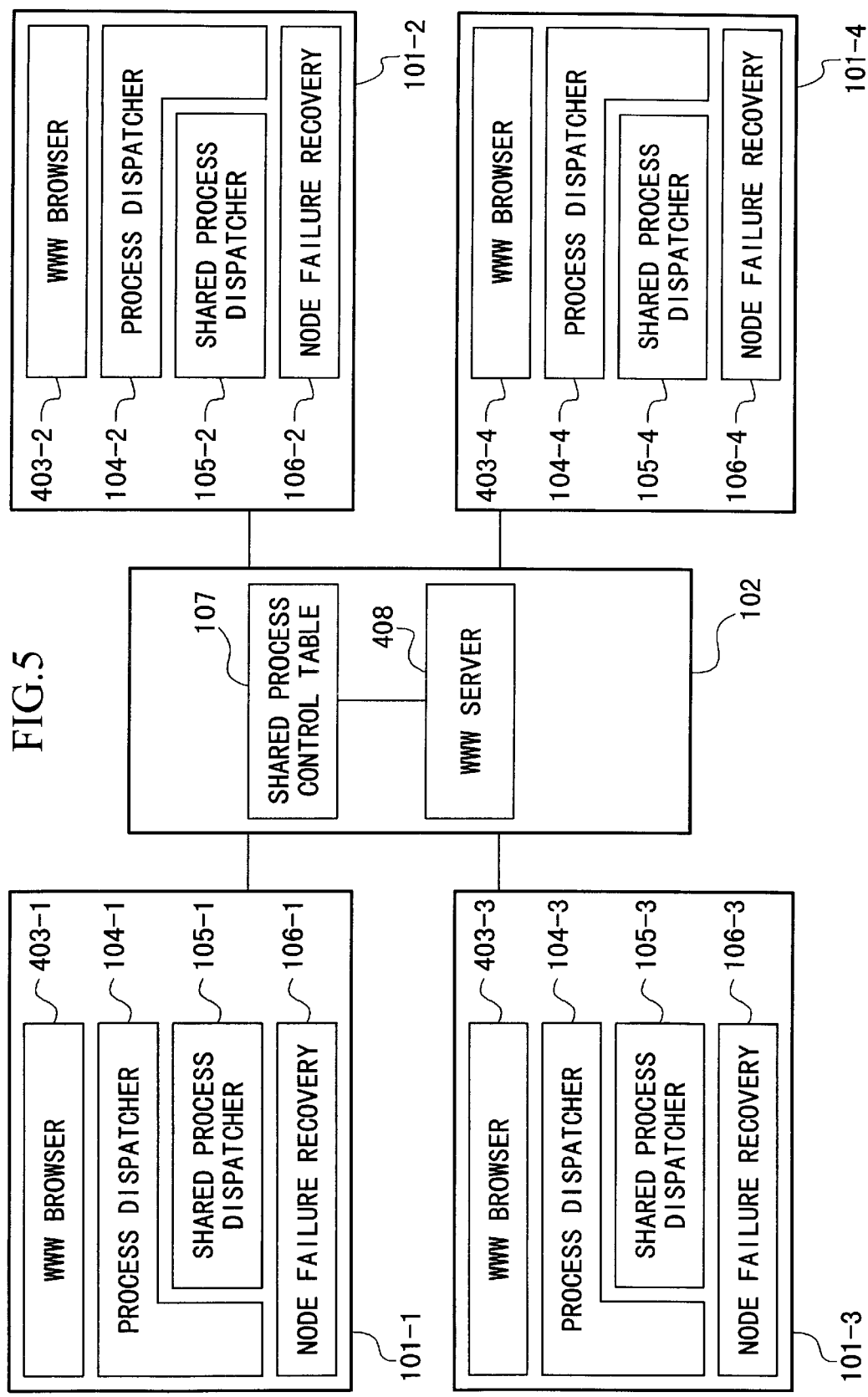

DEVICE AND METHOD FOR SHARED PROCESS CONTROL

BACKGROUND OF THE INVENTION

1. Field of the Invention

This invention relates to devices and methods for shared process control of computer systems which are configured using multiple nodes.

This application is based on Patent Application No. Hei 10-17936 filed in Japan, the content of which is incorporated herein by reference.

2. Description of the Related Art

Conventionally, the computer systems are configured using multiple nodes. In order to provide the same service at each node, the resident process (e.g., various kinds of server processes) is set to operate fixedly at a specific node. When such a specific node receives a service request from another node by means of the nodes communications, it executes the corresponding service. In some case, the node returns result of execution to a node which is a request source according to needs.

For example, the above is described on pages 3–16 and pages 39–41 of the paper entitled "ACOS Software, ACOS-4/XVP PX, JES-PX Explanation and User Manual", which is the sixth edition published on September of 1996 by NEC Corporation.

The aforementioned computer system suffers from a problem that if a failure occurs on the node at which the resident process is presently operating, the service must be stopped. Because, if the failure occurs on the node at which the resident process is presently operating, the resident process is compelled to stop.

Another type of the computer system is designed such that each node executes the service by performing exclusion on the resource while starting the same program at the nodes simultaneously. However, this type of the computer system suffers from a problem that the redundant resource should be required to start the same program at each of the nodes.

SUMMARY OF THE INVENTION

It is an object of the invention to provide a device for shared process control of a computer system that is capable of providing the service at each of nodes without using the resource so much unless a failure occurs on the node presently activated.

It is another object of the invention to provide a method for the shared process control of the computer system.

It is a further object of the invention to provide a machine-readable media storing programs and data that cause the computer system to perform the shared process control.

A computer system incorporating the device and method for shared process control in accordance with this invention is configured by multiple nodes, each coupled with a recording medium and a shared memory, which contains a shared process control table and multiple shared processes. Herein, each of the nodes contains a shared process dispatcher and a node failure recovery unit, while the shared process control table stores multiple shared process control entries, each of which further contains a process control block and a node flag representing a node that presently occupies the corresponding shared process.

At issuance of a service request for a present node within the multiple nodes, a decision is made as to whether the shared process is occupied by other nodes. If the shared process is occupied by the other nodes, the shared process dispatcher of the present node controls issuance of the service request to wait. If not, it controls the node flag to represent an even that the shared process is occupied by the present node while controlling the shared process to process the service request. After completion in processing of the service request by the shared process, the shared process dispatcher of the present node clears the node flag to place the process control block in a state to wait for a next service request. In addition, it also communicates with the shared process dispatchers of the other nodes to inform them of an event that the shared process is released.

At occurrence of a failure on a "failure" node within the multiple nodes, the node failure recovery units of other nodes which are normal make mediation to designate one of them as one that actually copes with the failure. Thus, the designated node failure recovery unit clears the node flag while placing the process control block in a state to wait for a service request. In addition, it communicates with the node failure recovery units of other nodes, which are normal, to inform them of an event that the shared process is capable of receiving a service request.

BRIEF DESCRIPTION OF THE DRAWINGS

These and other objects, aspects and embodiment of the present invention will be described in more detail with reference to the following drawing figures, of which:

FIG. 5 is a block diagram showing a configuration of a computer system in accordance with embodiment 2 of the invention.

DESCRIPTION OF THE PREFERRED EMBODIMENT

This invention will be described in further detail by way of examples with reference to the accompanying drawings.

[A] Embodiment 1

Figure 1:
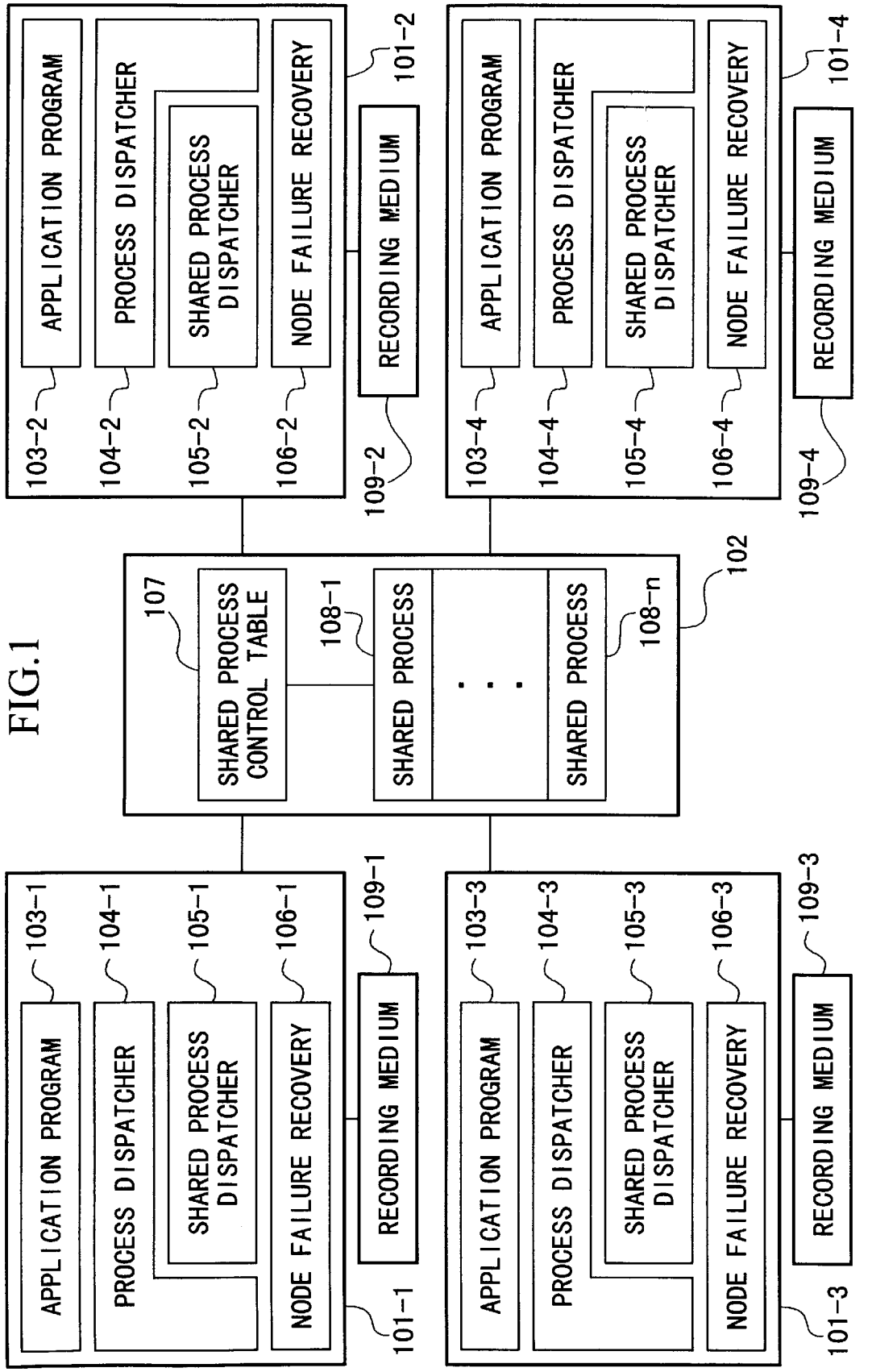
FIG. 1 is a block diagram showing an internal configuration of a computer system in accordance with embodiment 1 of the invention.

FIG. 1 is a block diagram showing a computer system in accordance with embodiment 1 of the invention. The computer system of FIG. 1 is configured using four nodes 101-1 to 101-4, a shared memory 102 and four recording media 109-1 to 109-4. Herein, each of the nodes 101-1 to 101-4 is accessible to the shared memory 102.

The shared memory 102 contains shared processes 108-1 to 108-$n$ and a shared process control table 107. Herein, the shared processes 108-1 to 108-$n$ provide the nodes 101-1 to 101-4 with services, while the shared process control table 107 stores data that are used for execution control of the shared processes 108-1 to 108-$n$ (where "n" is an integer arbitrarily selected).

The nodes 101-1 to 101-4 contain application programs 103-1 to 103-4, process dispatchers 104-1 to 104-4, shared process dispatchers 105-1 to 105-4 and node failure recovery units 106-1 to 106-4 respectively. Herein, the application programs 103-1 to 103-4 issue service requests for the shared processes 108-1 to 108-$n$, while the shared process dispatchers 105-1 to 105-4 cooperate with the process dispatchers 104-1 to 104-4 to perform execution control on the shared process 108-1 to 108-$n$. In addition, each of the recording media 109-1 to 109-4 records a program for actualizing a shared process control device. This program is read by each of the nodes 101-1 to 101-4 to control operation of each of the nodes 101-1 to 101-4. Thus, it is possible to actualize the process dispatchers 104-1 to 104-4, shared process dispatchers 105-1 to 105-4 and node failure recovery units 106-1 to 106-4 on the nodes 101-1 to 101-4 respectively.

Figure 2:
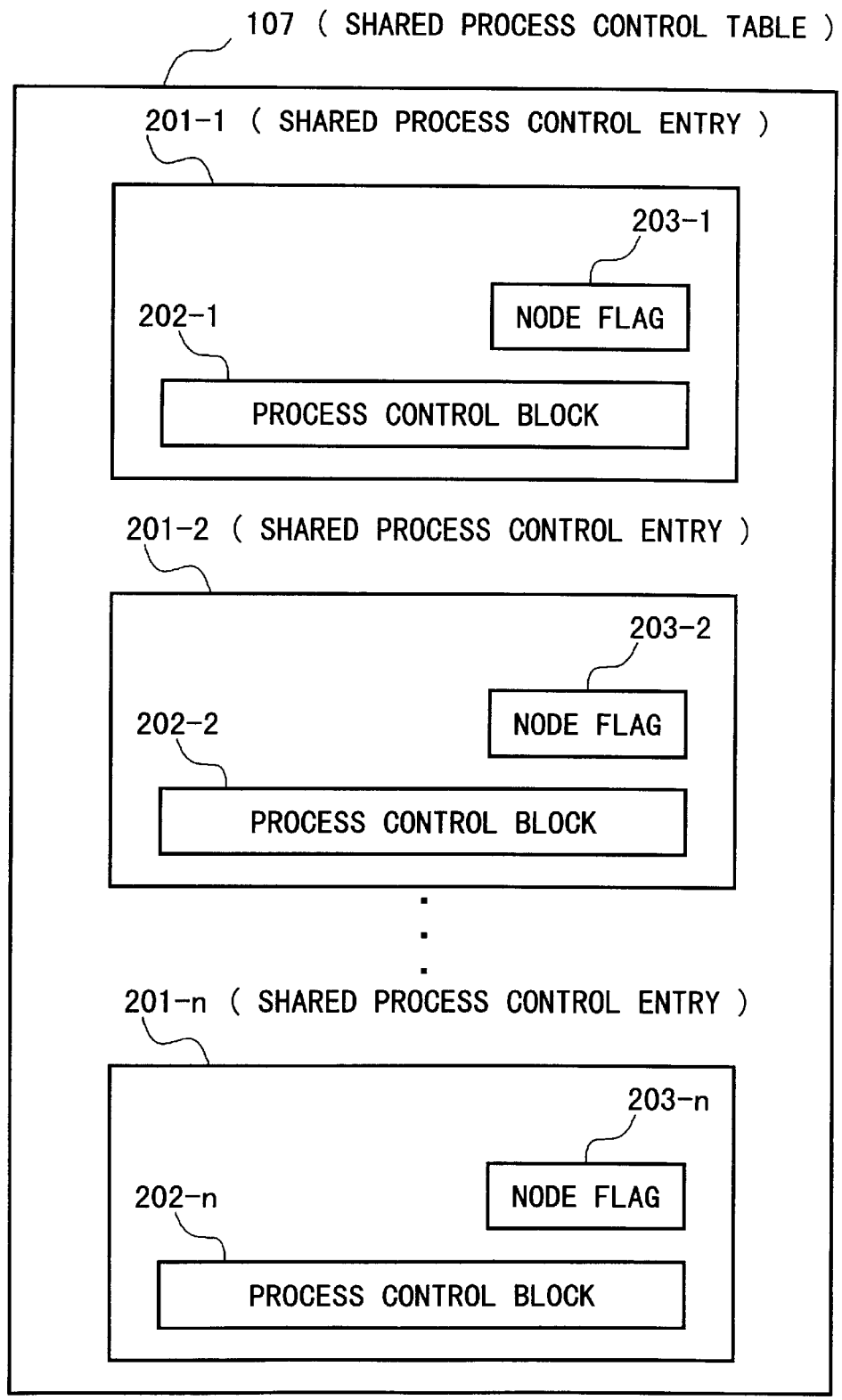
FIG. 2 is a block diagram showing an example of content of a shared process control table shown in FIG. 1.

FIG. 2 shows an example of an internal configuration of the shared process control table 107. Basically, the shared process control table 107 is configured by multiple shared process control entries 201-1 to 201-$n$. Those shared process control entries 201-1 to 201-$n$ are provided in connection with the shared processes 108-1 to 108-$n$ respectively.

The shared process control entries 201-1 to 201-$n$ contain process control blocks 202-1 to 202-$n$ and node flags 203-1 to 203-$n$ in connection with the shared processes 108-1 to 108-$n$ respectively. Herein, each of the node flags 203-1 to 203-$n$ indicates each of the nodes that occupy the shared processes 108-1 to 108-$n$ respectively.

Next, a description will be given with respect to operations of the aforementioned computer system.

Suppose a situation that the application program 103-1 of the node 101-1 issues a service request to the shared process 108-$i$ (where $1 \leq i \leq n$).

When the application program 103-1 issues the service request, the process dispatcher 104-1 makes a decision as to whether the service request should be processed by the shared process 108-$i$ or not.

If the process dispatcher 104-1 determines that the service request should not be processed by the shared process 108-$i$, it performs the process similar to the process which is conventionally performed. In contrast, if the process dispatcher 104-1 determines that the service request should be processed by the shared process 108-$i$, it passes the service request issued by the application program 103-1 to the shared process dispatcher 105-1.

Figure 3:
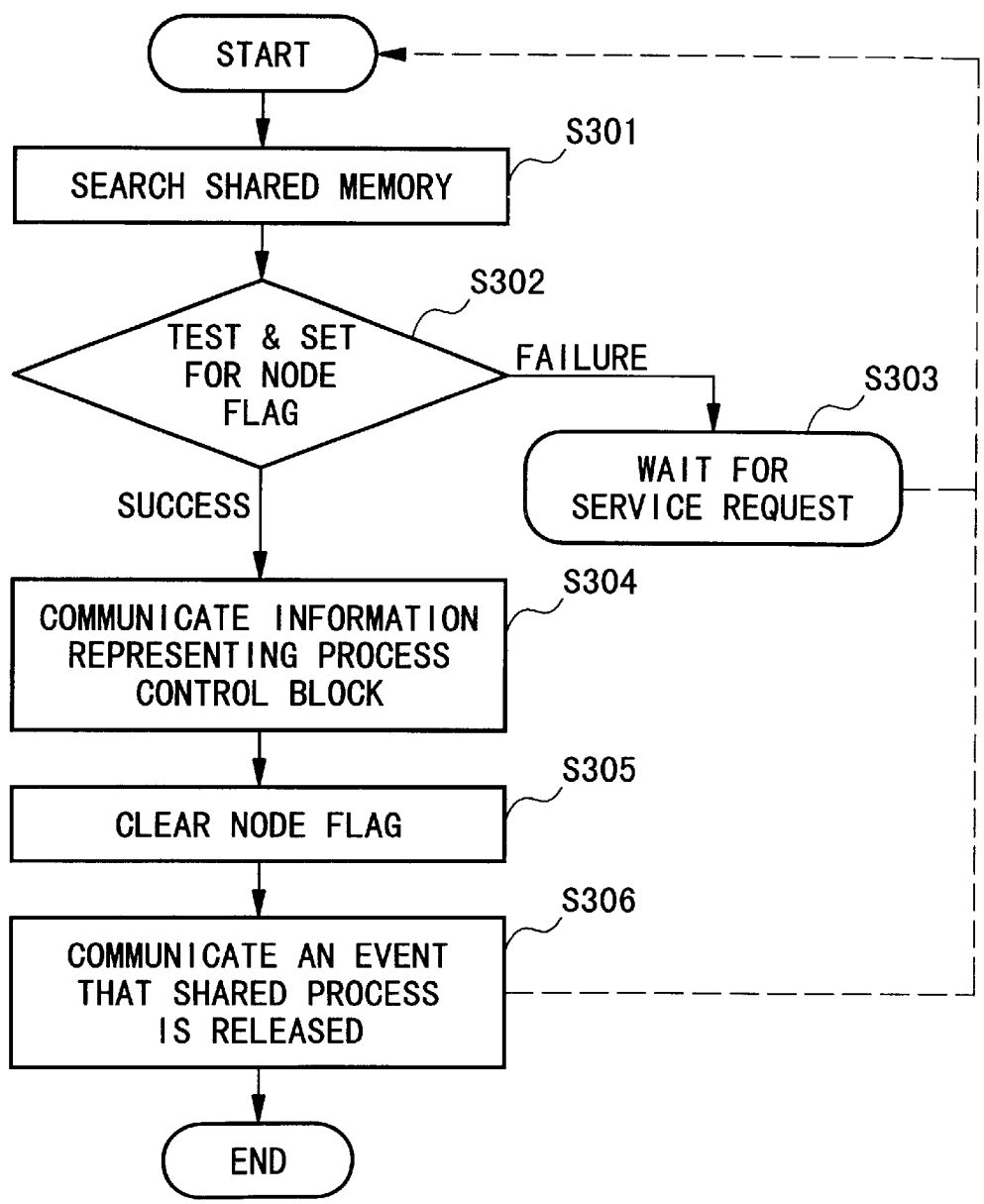
FIG. 3 is a flowchart showing an example of content of processing performed by a shared process dispatcher shown in FIG. 1.

Thus, the shared process dispatcher 105-1 activates a series of steps shown in FIG. 3. That is, the shared process dispatcher 105-1 firstly proceeds to step S301 wherein it searches through the shared process control table 107 to find out the shared process control entry 201-$i$ corresponding to the shared process 108-$i$ that processes the service request.

Next, the shared process dispatcher 105-1 transfers control to step S302. Herein, it uses an instruction that enables test-and-set operations in an indivisible manner, in other words, it uses a single instruction that is capable of performing value checking and value setting. Using such an instruction, it effects the test-and-set operations on the node flag 203-$i$ within the shared process control entry 201-$i$. Incidentally, the value to be set corresponds to a node identifier of the present node.

If the shared process 108-$i$ is occupied by another node (i.e., 101-2, 101-3 or 101-4), the test-and-set operations result in failure, so the shared process dispatcher 105-1 puts the service request in a waiting state in step S303.

On the other hand, if the shared process 108-$i$ is not occupied by another node (101-2 to 101-4), the test-and-set operations succeed, so the node flag 203-$i$ indicates an event that the shared process 108-$i$ is occupied by the node 101-1.

When the test-and-set operations succeed with respect to the node flag 203-$i$, the shared process dispatcher 105-1 proceeds to step S304, wherein it communicates information representing the process control block 201-$i$ to the process dispatcher 104-1. Thus, the process dispatcher 104-1 uses the shared process 108-$i$ corresponding to the process control block 201-$i$ as the dispatching subject so as to control execution of the shared process 108-$i$. Thus, the process dispatcher 104-1 forces the shared process 108-$i$ to process the requested service. Incidentally, a CPU (not shown) on the node 101-1 executes the shared process 108-$i$ on the shared memory 102.

When the shared process 108-$i$ completes processing of the requested service, the shared process dispatcher 105-1 clears the node flag 203-$i$ within the shared process control entry 201-$i$, while it also restores the process control block 202$i$ to be in a request waiting state in step S305. Thereafter, the shared process dispatcher 105-1 transfers control to step S306, wherein it communicates with the other nodes 101-2 to 101-4 via the shared memory 102 to inform them of an event that the shared process 108-$i$ is released. Thus, if the shared process dispatchers 105-2 to 105-4 provided within the other nodes 101-2 to 101-4 are put in waiting states to wait for issuance of service requests with respect to the shared process 108-$i$, they try to make such service requests again.

Next, operations of the computer system of FIG. 1 will be described with respect to a situation where while the node 101-1 occupies the shared process 108-$j$ (where $1 \leq j \leq n$), a failure occurs on the node 101-1 so that the node 101-1 is unable to continue execution of the shared process 108-$j$.

Normally, each of the nodes 101-1 to 101-4 monitors states of the other nodes by each of the node failure recovery units 106-1 to 106-4. So, when a certain node detects occurrence of a failure on another node, the corresponding node failure recovery unit performs processing of a flowchart shown in FIG. 4. In the aforementioned situation where the failure occurs on the node 101-1, the node failure recovery units 106-2 to 106-4 of the nodes 101-2 to 101-4 perform steps of the flowchart of FIG. 4.

At first, the node failure recovery units 106-2 to 106-4 proceed to step S401. Herein, when the node failure recovery units 106-2 to 106-4 detect occurrence of the failure on the node 101-1, they make a mediation between them to determine the node failure recovery unit that actually performs recovery for the failure of the node 101-1. It is possible to employ an arbitrary method for determination of the node failure recovery unit that actually performs the recovery. For example, it is possible to employ a method as follows:

The node failure recovery units 106-1 to 106-4 are given different degrees of priority in advance. So, a node failure recovery unit having a highest degree of priority is selected from among the node failure recovery units corresponding to the "normal" nodes in which failures do not occur as the designated node failure recovery unit that actually performs recovery.

Now, suppose that in step S401, the node failure recovery unit 106-4 is determined as one that actually performs the recovery. In that case, a decision of step S402 results in "NO" with respect to the remained node failure recovery units 106-2 and 106-3, which in turn end processing thereof with regard to the flowchart of FIG. 4. In contrast, the decision of step S402 results in "YES" with respect to the node failure recovery unit 106-4, which will proceed to steps S403 and S404. Namely, the node failure recovery unit 106-4 searches through the shared process control table 107 to make an examination as to whether there exists the shared process occupied by the "failure" node 101-1 or not.

Figure 4:
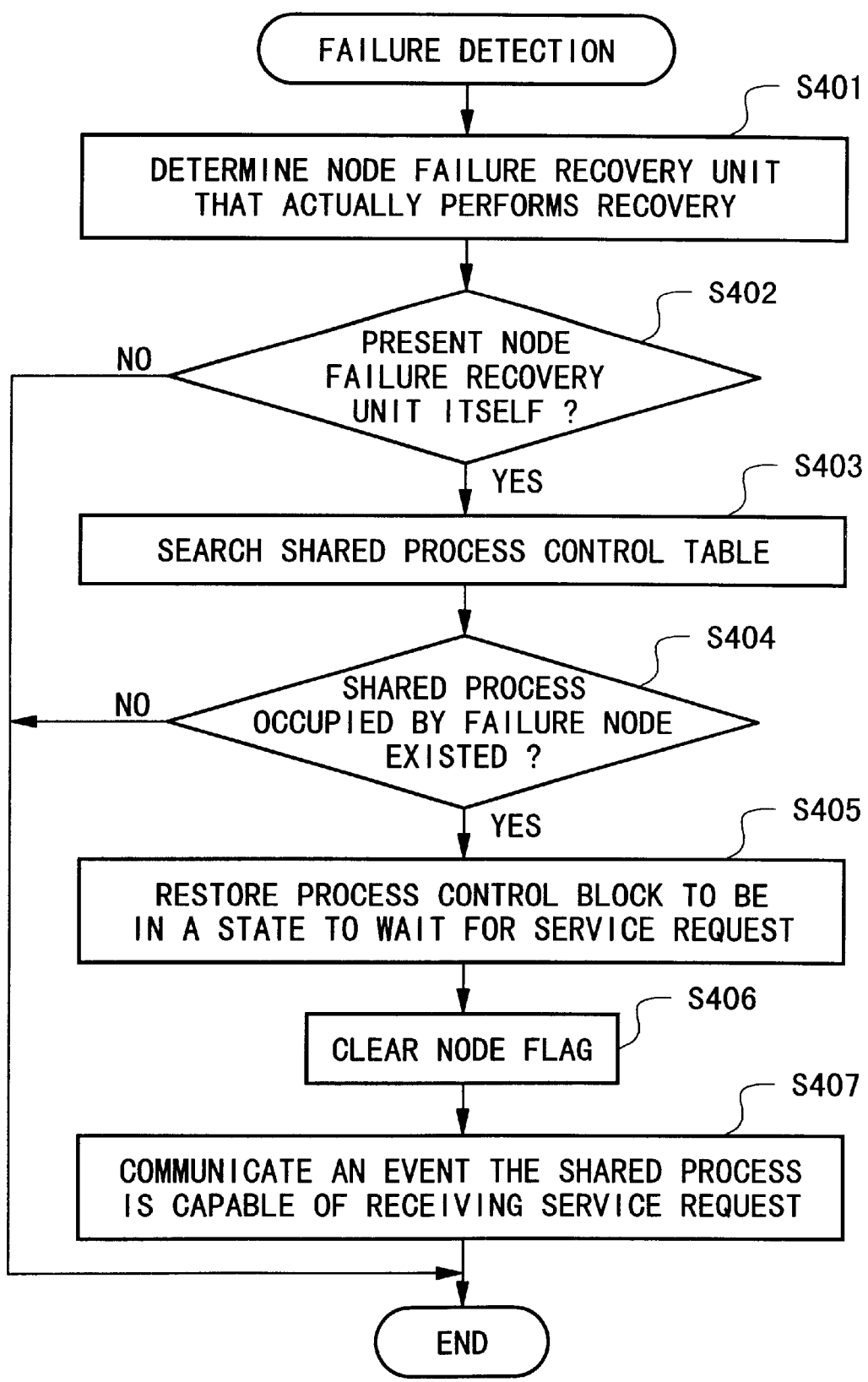
FIG. 4 is a flowchart showing an example of content of processing performed by a node failure recovery unit shown in FIG. 1.

If no shared process is occupied by the failure node 101-1, in other words, if a decision of step S404 results in "NO", the node failure recovery unit 106-4 ends the processing thereof with regard to the flowchart of FIG. 4. In contrast, if there exists the shared process occupied by the failure node 101-1, the node failure recovery unit 106-4 transfers control to step S405.

In this case, the failure node 101-1 occupies the shared process 108j. So, the node failure recovery unit 106-4 restores the process control block 202-j corresponding to the shared process 108-j to be in a state to wait for a service request. In step S406, it clears the corresponding node flag 203-j. Thereafter, the node failure recovery unit 106-4 transfers control to step S407. Herein, the node failure recovery unit 106-4 communicates with the shared process dispatchers 105-2 to 105-4 of the "normal" node 101-2 to 101-4 to inform them of an event that the shared process 108-j is capable of receiving a service request. Thus, if the shared process dispatchers 105-2 to 105-4 of the normal nodes 101-2 to 101-4 are put in states to wait for issuance of service requests with regard to the shared process 108-j, they try to issue the service requests again.

As described above, the present embodiment is designed to perform exclusive control by performing test-and-set operations on the node flags. Incidentally, the similar exclusive control can be performed by using nodes semaphore.

[B] Embodiment 2

Next, a computer system of embodiment 2 of the invention will be described with reference to FIG. 5, wherein parts corresponding to those shown in FIG. 1 are designated by the same reference symbols.

Like the aforementioned computer system of the embodiment 1 shown in FIG. 1, the computer system of the embodiment 2 shown in FIG. 5 is configured using the nodes 101-1 to 101-4 and shared memory 102. Different from the foregoing shared memory 102 shown in FIG. 1, the shared memory 102 shown in FIG. 5 contains a www server (where "www" is an abbreviation for "world wide web") 408, which is one kind of the shared process, in addition to the shared process control table 107. The nodes 101-1 to 101-4 contain the process dispatchers 104-1 to 104-4, shared process dispatchers 105-1 to 105-4 and node failure recovery units 106-1 to 106-4 respectively. In addition, the nodes 101-1 to 101-4 further contain www browsers 403-1 to 403-4, which are application programs for issuing service requests with respect to the www server 408.

Next, a description will be given with respect to operations of the computer system of FIG. 5.

Now, suppose that the www browser 403-1 of the node 101-1 issues a service request to the www server 408.

The process dispatcher 104-1 makes a decision as to whether the service request issued by the www browser 403-1 should be processed by the shared process or not.

If the process dispatcher 104-1 determines that the above service request should not be processed by the shared process, it performs processing similar to the processing that is conventionally performed. In contrast, if the process dispatcher 104-1 determines that the service request should be processed by the shared process, it passes the service request, issued by the www browser 403-1, to the shared process dispatcher 105-1.

Thus, the shared process dispatcher 105-1 performs the aforementioned processing in accordance with the flowchart shown in FIG. 3. That is, in step S301, it searches through the shared process control table 107 to find out a shared process control entry corresponding to the www server 408 that processes the service request.

In step S302, the shared process dispatcher 105-1 performs test-and-set operations on the node flag corresponding to the www server 408.

If the www server 408 is occupied by another node (i.e., 101-2, 101-3 or 101-4), execution of the test-and-set operations results in failure. So, in step S303, the shared process dispatcher 105-1 puts issuance of the service request in a waiting state.

In contrast, if the www server 408 is not occupied by the other nodes 101-2 to 101-4, the test-and-set operations will succeed. So, the www server 408 would be occupied by the node 101-1.

When the test-and-set operations succeed with respect to the node flag corresponding to the www server 408, the shared process dispatcher 105-1 communicates information representing the process control block corresponding to the www server 408 to the process dispatcher 104-1 in step S304. Therefore, the process dispatcher 104-1 uses the www server 408 as the dispatching subject to control execution of the www server 408. Thus, it is possible to force the www server 408 to process the requested service.

When the www server 408 completes the requested service, the shared process dispatcher 105-1 clears the node flag corresponding to the www server 408 while it also restores the process control block corresponding to the www server 408 to be in a waiting state to wait for a service request in step S305. Then, the shared process dispatcher 105-1 communicates with the other nodes 101-2 to 101-4 via the shared memory 102 to inform them of an event that the www server 408 is released in step S306. Thus, if the nodes 101-2 to 101-4 have waited for issuance of service requests with respect to the www server 408, the corresponding shared process dispatchers 105-2 to 105-4 try to issue the server requests again.

Next, suppose a situation that while the node 101-1 occupies the www server 408 which is the shared process, a failure occurs on the node 101-1 so that the node 101-1 is unable to continue execution of the www server 408. So, a description will be given with respect to operations of the computer system of FIG. 5 in such a situation.

Like the aforementioned embodiment 1 shown in FIG. 1, each of the node failure recovery units 106-1 to 106-4 of the nodes 101-1 to 101-4 monitors states of the other nodes. So, when it detects occurrence of a failure on another node, it performs processing in accordance with the flowchart of FIG. 4. In the present situation where the failure occurs on the node 101-1, each of the node failure recovery units 106-2 to 106-4 of the nodes 101-2 to 101-4 performs the processing of FIG. 4.

When the node failure recovery units 106-2 to 106-4 detect that a failure occurs on the node 101-1, they make a mediation between them. Thus, they determine the node failure recovery unit that actually performs recovery with respect to the node 101-1 in step S401.

Suppose that the step S401 determines the node failure recovery unit 106-4 to actually perform the recovery. In that case, a decision of step S402 results in "NO" with respect to the node failure recovery units 106-2 and 106-3, which in turn end the processing of FIG. 4. On the other hand, the decision of step S402 results in "YES" with respect to the node failure recovery unit 106-4, which proceeds to steps S403 and S404. That is, the node failure recovery unit 106-4 searches through the shared process control table 107 to make a decision as to whether there exists the shared process occupied by the "failure" node 101-1 or not.

If no shared process is presently occupied by the failure node 101-1, in other words, if a decision of step S404 results in "NO", the node failure recovery unit 106-4 ends the processing of FIG. 4. In contrast, if there exists the shared process presently occupied by the failure node 101-1, the node failure recovery unit 106-4 proceeds to step S405.

In this case, the failure node 101-1 occupies the www server 408 which is the shared process. So, the node failure recovery unit 106-4 restores the process control block corresponding to the www server 408 to be in a waiting state to wait for receipt of a service request in step S405. Then, it clears the node flag corresponding to the www server 408 in step S406. In next step S407, the node failure recovery unit 106-4 communicates with the shared process dispatchers 106-2 to 106-4 of the "normal" nodes 101-2 to 101-4 to inform them of an event that the www server 408 is able to receiving a service request. Thus, if the nodes 101-2 to 101-4 wait for issuance of service requests with respect to the www server 408, the corresponding shared process dispatchers 105-2 to 105-4 try to issue the service requests again.

Lastly, effects of this invention will be described below.

(1) According to a first effect of this invention, each of the nodes is capable of receiving the service without using the resource so much unless a failure occurs on each of the nodes itself. This is accomplished by the unique configuration of this invention, wherein the shared processes for providing services are located on the shared memory to which each of the nodes is accessible, while each of the nodes is configured by the shared process dispatcher for controlling execution of the shared process and the node failure recovery unit for purging an execution right of the shared process from the "failure" node, occupying the shared process, in which a failure occurs.

(2) According to a second effect of this invention, the node that waits for issuance of the service request is capable of starting processing to occupy the shared process immediately after the shared process is released. Because, the shared process dispatcher has a function that after the shared process completes processing in accordance with the service request, the corresponding node communicates with the other nodes to inform them of an event that the shared process is released.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A shared process control device for a computer system comprising:

a plurality of nodes; and a shared memory to which each of the nodes is accessible and on which at least a shared process is located, the shared memory storing a shared process control table containing a process control block of the shared process and a node flag for indicating one of the nodes that presently occupies the shared process, wherein each of the nodes comprises a shared process dispatcher in which when a service request is issued from a request source to the shared process in a corresponding node, a decision is made based on the node flag as to whether the shared process is occupied by other nodes, other than the node corresponding to the shared process dispatcher within the plurality of nodes, or not, so that if the shared process is occupied by the other nodes, the shared process dispatcher forces its corresponding node to wait for issuance of the service request, while if the shared process is not occupied by the other nodes, the shared process dispatcher controls the node flag to represent an event that its corresponding node presently occupies the shared process so as to instruct the shared process to process the service request, and a node failure recovery unit, activated when a failure occurs on one of the other nodes, for if the shared process is occupied by one of the other nodes, clearing the node flag and for placing the process control block in a state to receive a service request.

2. A shared process control device for the computer system according to claim 1, wherein when the shared process completes processing in accordance with the service request issued by the node corresponding to the shared process dispatcher, the shared process dispatcher clears the node flag and places the process control block in a state to receive a next service request, while the shared process dispatcher also communicates with the other nodes to inform shared process dispatchers of the other nodes of an event that the shared process is released.

3. A shared process control device for the computer system according to claim 2, wherein the request source corresponds to a www browser while the shared process corresponds to a www server.

4. A machine-readable media storing data and programs that cause a computer system to perform a shared process control method, wherein the computer system comprises a plurality of nodes and a shared memory to which each of the nodes is accessible and on which at least a shared process is located, and wherein the shared memory stores a shared process control table containing a process control block of the shared process and a node flag for indicating one of the nodes that presently occupies the shared process, said shared process control method, being performed with respect to each of the nodes, comprising the steps of:

actualizing a function of a shared process dispatcher in which when a service request is issued from a request source to the shared process in a corresponding node, a decision is made based on the node flag as to whether the shared process is occupied by other nodes, other than the node corresponding to the shared process dispatcher within the plurality of nodes, or not, so that if the shared process is occupied by the other nodes, the shared process dispatcher forces its corresponding node to wait for issuance of the service request, while if the shared process is not occupied by the other nodes, the shared process dispatcher controls the node flag to represent an event that its corresponding node presently occupies the shared process so as to instruct the shared process to process the service request; and actualizing a function of a node failure recovery unit, activated when a failure occurs on one of the other nodes, for if the shared process is occupied by one of the other nodes, clearing the node flag and for placing the process control block in a state to receive a service request.

5. A shared process control device for a computer system comprising:
- a plurality of nodes containing first and second nodes, each of which is coupled with a recording medium; and
- a shared memory for storing a shared process control table and at least one shared process,
    - wherein the shared process control table stores a process control block of the shared process and a node flag for indicating a node the presently occupies the shared process,
    - and wherein each of the plurality of nodes contains a shared process dispatcher, being activated by issuance of a service request, for controlling the shared process based on the node flag, and
- a node failure recovery unit, being activated by occurrence of a failure, for clearing the node flag and for placing the process control block in a state to wait for the service request.

6. A shared process control device for the computer system according to claim 5, wherein if it is determined based on the node flag that the shared process is occupied by the second node, the shared process dispatcher corresponding to the first node making the issuance of the service request to wait.

7. A shared process control device for the computer system according to clam 5, wherein if it is determined based on the node flag that the shared process is not occupied by the plurality of nodes, the shared process dispatcher corresponding to the first node controls the node flag to represent an event that the first node presently occupies the shared node and then instructs the shared process to process the service request.

8. A shared process control device for the computer system according to claim 5, wherein when the shared process completes processing in accordance with the service request issued by the first node, the shared process dispatcher of the first node clears the node flag to place the process control block in a state to wait for a next service request, while the shared process dispatcher of the first node communicates with the second node to inform it of an even that the shared process is released.

9. A shared process control method for a computer system containing a plurality of nodes each containing a node failure recovery unit as well as a shared memory on which a shared process control table and at least a shared process are located, wherein the shared process control table stores a node flag and a process control block, said shared process control method comprising the steps of:
- detecting occurrence of a failure on a failure node within the plurality of nodes under a condition that the shared process is presently occupied by the failure node;
- designating one of the plurality of nodes, except the failure node, whose node failure recovery unit actually copes with the failure;
- clearing the node flag while placing the process control block in a state to wait for a service request under control of the node failure recovery unit of the designated node; and
- making the node failure recovery unit of the designated node to communicate with other nodes, other than the failure node and the designated node, to inform them of an event that the shared process is capable of receiving the service request.

* * * * *